United States Patent [19]

Rowland et al.

[11] 3,773,556

[45] Nov. 20, 1973

[54] POLYETHYLENE STABILIZED WITH 2,6-DI (1-METHYL HEPTADECYL)-4-ALKYL PHENOL

[75] Inventors: Bobby A. Rowland; Stanley L. Tate, both of Carrollton, Ga.

[73] Assignee: Southwire Company, Carrollton, Ga.

[22] Filed: Dec. 29, 1971

[21] Appl. No.: 213,546

[52] U.S. Cl.............. 117/232, 161/216, 260/41 R, 260/41 A, 260/41 B, 260/45.95, 260/94.9 GA
[51] Int. Cl. .......................... B44d 1/34, C08f 45/58
[58] Field of Search...................... 260/41, 94.9 GA, 260/45.95; 117/232; 161/216

[56] References Cited
UNITED STATES PATENTS

| | | | |
|---|---|---|---|
| 3,335,124 | 8/1967 | Larsen | 260/94.9 |
| 3,118,866 | 1/1964 | Gregorian | 260/94.9 |
| 3,454,525 | 7/1969 | Tholstrup | 260/45.85 |
| 2,916,481 | 12/1959 | Gilmont | 260/94.9 |
| 3,017,376 | 1/1962 | Bafford et al. | 260/23 |

*Primary Examiner*—Morris Liebman
*Assistant Examiner*—J. H. Derrington
*Attorney*—Van C. Wilks et al.

[57] ABSTRACT

This invention relates to a composition of matter consisting of vulcanizable polyethylene which is protected from oxidative deterioration over a period of time. More specifically this invention is directed to a composition of polyethylene cross-linked by a bisperoxide in the presence of an antioxidant such as 2,6-di(1-methyl heptadecyl)-4-alkyl phenol.

50 Claims, No Drawings

POLYETHYLENE STABILIZED WITH 2,6-DI (1-METHYL HEPTADECYL)-4-ALKYL PHENOL

DESCRIPTION OF THE PRIOR ART

Polyethylene cross-linked by a bisperoxide, such as α, α, α', α'-tetramethyl isophthalyl di-t-butyl bisperoxide, was disclosed in U.S. Pat. No. Re25,941. U.S. Pat. No. 2,888,424 discloses cross-linked polyethylene filled with silica, carbon black, alumina or calcium silicate. Chemically crosslinked polyethylene stabilized with polymerized trimethyl quinoline was disclosed in U.S. Pat. No. 3,296,189.

DESCRIPTION OF THE PREFERRED EMBODIMENTS

Peroxide vulcanized or cross-linked polyethylene possesses properties such as temperature stability, solvent resistance, and tensile strength which enable it to be used in many applications where thermoplastic polyethylene would be unsatisfactory. However, extreme care must be exercised in compounding the composition to avoid excess peroxide since the same properties which make peroxides cross-linking agents will bring about oxidation deterioration in the final product.

The solution to the problem of oxidative deterioration in the polyethylene caused by the presence of peroxide would appear to be the addition of antioxidants such as those developed in rubber technology. However, antioxidants are substances which will selectively combine with oxygen thereby converting oxygen from a state in which it can promote oxidation of an important component of a composition to one in which it combines with a minor component which holds it in a state where it can do no further harm. It would be predicted that antioxidants would combine with peroxides, or decomposition products thereof, to cancel out both the cross-linking activity of the peroxide and the antioxidant activity, and experimental evidence has shown that this is what happens in the case of most antioxidants.

The present invention has as one of its objects to provide a peroxide cross-linkable polyethylene composition which is stabilized against oxidative deterioration.

Another object of the invention is to provide a peroxide cross-linked polyethylene composition which includes an antioxidant.

Briefly stated, in accordance with one of its embodiments, this invention is directed to a curable composition comprising polyethylene, a bisperoxide having the general formula:

I.
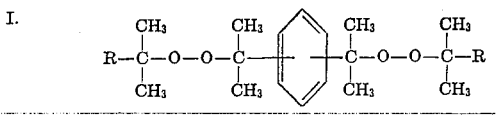

where R is a member of the group consisting of methyl and phenyl, and a stabilizer consisting of 2,6-di(1-methyl heptadecyl)-4-alkyl phenol.

In accordance with this invention, it has been discovered that 2,6-di(1-methyl heptadecyl)-4-alkyl phenol II.
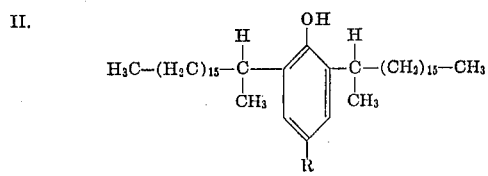

where R is a lower alkyl containing from one to four carbon atoms, will act as an antioxidant for peroxide cross-linked polyethylene without significantly interfering with the cross-linking activity of the peroxide. When 2,6-di(1-methyl heptadecyl)-4-alkyl phenol is present in proportions of less than about 4.0 percent based on the weight of polyethylene present, there is frequently an enhancement of the properties of the product. For example, the addition of 0.5 parts of 2,6-di(1-methyl heptadecyl)-4-alkyl phenol per 100 parts of polyethylene produced a product having a tensile strength of about 2,700 pounds per square inch versus about 2,600 pounds per square inch for a control sample in which 2,6-di(1-methyl heptadecyl)-4-alkyl phenol was absent.

In the antioxidant covered by Formula II, R can represent methyl, ethyl, ethylene, propyl, 2-propyl, propylene, n-butyl, 1-butylene, secondary butylene, 2-butylene, tertiary butyl, and isobutylene. Preferably R represents methyl, ethyl, propyl or n-butyl. The most preferred embodiment of this invention is where R represents methyl or ethyl.

If the antioxidant of this invention is present in excessive proportions, it has an inhibitory effect upon the activity of the cross-linking peroxide, though this inhibitory effect is not so great as that produced by equivalent quantities of other antioxidants common to polyethylene technology. A preferred range of 2,6-di(1-methyl heptadecyl)-4-alkyl phenol is from about 0.01 percent to about 4.0 precent by weight of the polyethylene present.

The 2,6-di(1-methyl heptadecyl)-4-alkyl phenol axtioxidants of this invention are operable both in filled and unfilled systems. Silica, carbon black, alumina, calcium silicate and the like are satisfactory filler materials usable in conjunction with the antioxidants of the invention.

The present invention is directed to a conposition which is suitable for both molding and extrusion. Its compounding is conventional in all respects. One method of handling is to introduce the components including the peroxide and 2,6-di(1-methyl heptadecyl)-4-alkyl phenol to a Ferrell continuous mixer maintained at a temperature slightly above the melting temperature of the polyethylene used. This step is followed by a milling operation which further works the composition prior to a shredding and dicing step. The diced material may then be stored until the final processing. It is preferable that the final processing take place within a relatively small number of days.

The bisperoxides of this invention are characterized as substantially decomposing at temperatures in excess of 130°C and having the general formula:

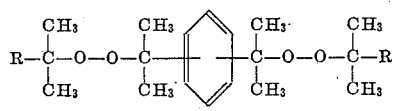

Two of the preferred bisperoxides used as cross-linking agents in this invention are α, α, α', α'-tetramethyl isophthalyl di-t-butyl bisperoxide, a compound of the formula:

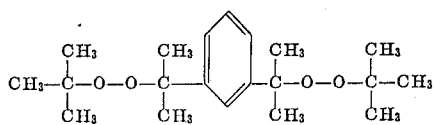

and α, α, α', α'-tetramethyl isophthalyl di-cumyl bis-peroxide, a compound of the formula:

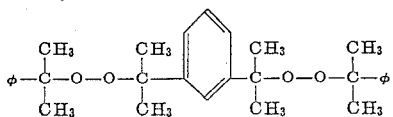

In addition, these peroxides may contain inorganic groups, such as halogens, nitro groups, etc., for example, chlorophenyl, bormophenyl, nitrophenyl, etc.

While the proportion of peroxide used depends upon the final properties sought in the cured material, a range of from about 0.1 percent to about 10 percent by weight of the polyethylene present satisfies most requirements, and the usual proportion is of the order of from about 0.5 percent to about 4.0 percent. Since the peroxide is more costly than polyethylene and any fillers which might be used, economy dictates using the minimum peroxide which will provide the properties desired in the cured material.

The invention applies generally to polyethylene whether it is made by the conventional high pressure process or the low pressure catalytic process. While polyethylene is the most important component of any of the compositions of this invention and the proportions of peroxide and 2,6-di(1-methyl heptadecyl)-4-alkyl phenol are recited in terms of the polyethylene present-other components may also be present. For example, filler materials such as those previously specified herein may be present from about 0.5 percent to about 400 percent by weight of polyethylene present.

This invention applied to copolymers of ethylene and other polymerizable materials such as propylene, ethyl acrylate, vinyl acetate and butylene. The copolymer materials may be present in proportions from less than about 1 percent to more than about 50 percent by weight of the polyethylene present. The invention likewise applies to mixtures of polyethylene and other polymers such as polyvinyl chloride, organopolysiloxanes, polymeric methyl acrylate, copolymers of butadiene and styrene, copolymers of butadiene and acrylonitrile, neoprene, polystyrene, various natural rubbers, etc.

The 2,6-di(1-methyl heptadecyl)-4-alkyl phenol stabilizers of this invention are unique in their application to peroxide-cured systems. A satisfactory antioxidant or stabilizer must not only impart good aging characteristics but must provide an extrusion mixture which does not produce a porous product. Such conventional rubber antioxidants as hydroquinone monobenzyl ether, polyalkyl polyphenol, octylated dephenylamine, di-tert-amyl-hydroquinone, phenyl-α-naphthylamine, the reaction product of diphenylamine and diisobutylene, and others produced porous products, suggesting poinsoning of the peroxide by the antioxidant.

The stabilized cross-like compositions of this invention have a variety of uses. One advantageous use is in insulation coatings for electrical conductors. An insulated electrical conductor can be formed by coating an electrically conductive material with one or more of the compositions of this invention. The compositions can be applied by any of the industry accepted methods of applying a polymerized insulation coating to an electrical conductor.

An advantageous method of coating an electrical conductor with one or more of the compositions of this invention is to extrude the composition, at a temperature of from about 170°F, onto an electrical conductor; cure the coated electrical conductor by passing it through a continuous vulcanization tube which has an operating temperature of from about 350°F to 480°F; and cool the cured, coated electrical conductor.

Below are several examples, which are intended to be illustrative rather than limiting, of the compositions of this invention.

EXAMPLE 1

Dylan WPD 205 polyethylene (100 parts) and Thermax carbon black (40 parts) were worked on a mill at 220°F and 0.5 parts 2,6-di(1-methyl heptadecyl)-4-methyl phenol and two parts αα, α', α'-tetramethyl isophthalyl di-t-butyl bisperoxide were added. The composition was molded in a press for 7 minutes at 350°F. A dumbell sample one-fourth inch wide and 0.07 inch thick was then cut for testing. The tensile strength of this sample was 2,375 p.s.i. and its elongation 395 percent. After 168 hours in an air oven at 121°C the tensile strength was 2,400 p.s.i. and elongation 405 percent.

A control sample of the same conposition except that the 2,6-di(1-methyl heptadecyl)-4-methyl phenol was omitted had a initial tensile strength of 2,520 p.s.i. and elongation 340 percent. After 72 hours in an air oven at 121°C this sample became brittle and remained in this state thereafter.

EXAMPLE 2

A sample was prepared in the manner set forth in Example 1 except that 0.5 parts 2,6-di(1-methyl heptadecyl)-4-ethyl phenol was present instead of 0.5 parts 2,6-di(1-methyl heptadecyl)-4-methyl phenol. The initial tensile strength of the test specimen as 2,405 p.s.i. and the elongation 390 percent. After 168 hours in an air oven at 121°C the tensile strength was 2,450 p.s.i. and elongation 390 percent.

EXAMPLE 3

A control sample consisting of 100 parts polyethylene, 100 parts carbon black, and 2.25 parts α, α, α', α'-tetramethyl isophthalyl di-t-butyl bisperoxide underwent a reduction in tensile strength from 2,700 p.s.i. to 1,800 p.s.i. after being aged for 168 hours at 121°C. Material of the same conposition with 0.50 parts 2,6-di(1-methyl heptadecyl)-4-methyl phenol added gave a product having an intial tensile strength of 2,455 p.s.i. which increased to 2,495 p.s.i. after an aging treatment for 168 hours at 121°C. The original elongation of the control was 180 percent. After 168 hours at 121°C this declined to 25 percent. The original elongation of the material having the same composition with 0.50 parts 2,6-di(1-methyl heptadecyl)-4-methyl phenol was 395 percent. After aging for 168 hours at 121°C the elongation increased to 410 percent.

EXAMPLE 4

A sample prepared in the manner set forth in Example 1 except that 1.5 parts 2,6-di(1-methyl heptadecyl)-4-methyl phenol were present had an initial tensile strength of 2,410 p.s.i. and an elongation of 400 percent. After 168 hours in an air oven at 121°C, the sample had a tensile strength of 2,425 p.s.i. and an elongation of 415 percent.

EXAMPLE 5

A sample was prepared in the manner set forth in Example 1. The sample was divided into two parts and tested as in Example 1. The initial tensile strength of this sample was 2,375 p.s.i. and the elongation 395 percent. One sample was put in an air oven for 168 hours at 121°C, the resulting tensile strength was 2,400 p.s.i. and elongation 405 percent. The other sample was oxygen-bomb aged in an oven at 70°C and 300 p.s.i. for 168 hours, the resulting tensile strength was 2,330 p.s.i. and elongation 390 percent.

EXAMPLE 6

A sample was prepared in the manner set forth in Example 1, except that 0.5 parts, 1,2-dihydro-2,2,4-trimethylquinoline (an industry accepted antioxidant for use in polyethylene production) was present instead of 0.5 parts 2,6-di(1-methyl heptadecyl)-4-methyl phenol. The test results of the sample before aging were: tensile strength 2,380 p.s.i. and elongation 340 percent; after aging in the manner set forth in Example 1 the tensile strength was 2,330 p.s.i. and elongation 325 percent.

EXAMPLE 7

A sample was prepared in the manner set forth in Example 1 except that two parts $\alpha, \alpha, \alpha', \alpha'$-tetramethyl isophthalyl di-cumyl bisperoxide were added instead of two parts $\alpha, \alpha$, -tetramethyl isophthalyl di-t-butyl bisperoxide. The tensile strength of the test specimen was 2,370 p.s.i. and its elongation 395 percent. After 168 hours in an air oven at 121°C the tensile strength was 2,330 p.s.i. and elongation 400 percent.

A control sample of the same composition except that the 2,6-di(1-methyl heptadecyl)-4-methyl phenol was omitted had an initial tensile strength of 2,390 p.s.i. and elongation 340 percent. After 72 hours in an air oven at 121°C this sample became brittle and remained in this state thereafter.

EXAMPLE 8

A sample was prepared in the manner set foth for Example 7 except that 0.5 parts 2,6-di(1-methyl heptadecyl)-4-ethyl phenol was present instead of 0.5 parts 2,6-di(1-methyl heptadecyl)-4-methyl phenol. The initial tensile strength of the test specimen was 2,420 p.s.i. and the elongation 400 percent. After 168 hours in an air oven at 121°C the tensile strength was 2,440 p.s.i. and elongation 415 percent.

EXAMPLE 9

A control sample consisting of 100 parts polyethylene, 100 parts carbon black, and 2.25 parts $\alpha, \alpha, \alpha', \alpha'$-tetramethyl isophthalyl di-cumyl bisperoxide underwent a reduction in tensile strength from 2,680 p.s.i. to 1,810 p.s.i. after being aged for 168 hours at 121°c. Material of the same composition with 0.50 parts 2,6-di(1-methyl heptadecyl)-4-methyl phenol added gave a product having an initial tensile strength of 2,460 p.s.i. which increased to 2,510 p.s.i after an aging treatment for 168 hours at 121°C. The original elongation of the control was 190 percent. After 168 hours at 121°C this declined to 40 percent. The original elongation of the material having the same composition with 0.50 parts 2,5-di(1-methyl heptadecyl)-4-methyl phenol was 395 percent. After aging for 168 hours at 121°C the elongation increased to 410 percent.

EXAMPLE 10

A sample prepared in the manner set forth in Example 7 except that 1.5 parts 2,6-di(1-methyl heptadecyl)-4-methyl phenol were present had an initial tensile strength 2,395 p.s.i. and an elongation of 370 percent. After 168 hours in an air oven at 121°C the sample had a tensile strength of 2,410 p.s.i. and an elongation of 390 percent.

EXAMPLE 11

A sample was prepared in the manner set foth in Example 7. The sample was divided into two parts and tested as in Example 7. The initial tensile strength of this sample was 2,370 p.s.i. and its elongation 395 percent. One sample was put in an air oven for 168 hours at 121°C, the resulting tensile strength was 2,360 p.s.i. and elongation 410 percent. The other sample was oxygen-bomb aged in an oven at 70°C and 300 p.s.i. for 168 hours, the resulting tensile strength was 2,300 p.s.i. and elongation 385 percent.

It should be understood that the air oven tests listed in the above examples are very rigorous. For example, correlation studies have shown that a sample which was reduced to 30 percent elongation after 5 hours at 210°C, for 6 days at 180°C, or 23 days at 165°C or 125 days at 150°C would have an expected service life of 15 years under conditions of continuous service at 120°C. All of the samples in the above examples which contained 2,6-di(1-methyl heptadecyl)-4-alkyl phenol would be expected to exceed this service life by a considerable margin.

While the invention has been described in detail with particular reference to certain preferred embodiments, it will be understood that variations and modifications can be effected within the spirit and scope of the invention as hereinbefore described and defined in the appended claims.

What is claimed is:

1. A curable composition of matter comprising:
   a. normally solid polyethylene:
   b. from about 0.1 percent to about 10 percent by weight of the polyethylene present of a bisperoxide of the formula:

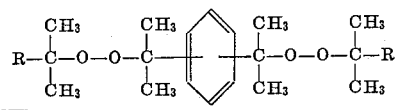

where R is selected from the group consisting of methyl and phenyl, said bisperoxide substantially decomposing at temperatures in excess of 130°C, thereby cross-linking the polyethylene of said composition; and
   c. from about 0.01 percent to about 4.0 percent by weight of the polyethylene present of the antioxidant 2,6-di(1-methyl heptadecyl)-4-alkyl phenol.

2. A cured composition according to claim 1, having been cured at a temperature in excess of 130°C.

3. A composition according to claim 1, wherein the bisperoxide is α, α, α', α'-tetramethyl isophthalyl di-t-butyl bisperoxide.

4. A cured composition according to claim 3, having been cured at a temperature in excess of 130°C.

5. A composition according to claim 1, wherein the bisperoxide is α, α, α', α'-tetramethyl isophthalyl di-cumyl bisperoxide.

6. A cured composition according to claim 5, having been cured at a temperature in excess of 130°C.

7. The composition of claim 1, wherein the antioxidant is 2,6-di(1-methyl heptadecyl)-4-methyl phenol.

8. A cured composition according to claim 7, having been cured at a temperature in excess of 130°C.

9. A composition according to claim 7, wherein the bisperoxide is α, α, α', α'-tetramethyl isophthalyl di-t-butyl bisperoxide.

10. A cured composition according to claim 9, having been cured at a temperature in excess of 130°C.

11. A composition according to claim 7, wherein the bisperoxide is α, α, α', α'-tetramethyl isophthalyl di-cumyl bisperoxide.

12. A cured composition according to claim 11, having been cured at a temperature in excess of 130°C.

13. The composition of claim 1, wherein the antioxidant is 2,6-di(1-methyl heptadecyl)-4-ethyl phenol.

14. A cured composition according to claim 13, having been cured at a temperature in excess of 130°C.

15. A composition according to claim 13, wherein, the bisperoxide is α, α, α', α'-tetramethyl isophthalyl di-t-butyl bisperoxide.

16. A cured composition according to claim 15, having been cured at a temperature in excess of 130°C.

17. A composition according to claim 13, wherein the bisperoxide is α, α, α', α'-tetramethyl isophthalyl di-cumyl bisperoxide.

18. A cured composition of matter according to claim 17, having been cured at a temperature in excess of 130°C.

19. An electrical conductor having an insulation coating of the composition of claim 1.

20. A curable composition comprising:
a. a member selected from the group consisting of polyethylene, blends of polyethylene and other polymers, copolymers of ethylene and other polymerizable materials;
b. from about 0.1 percent to about 10 percent by weight of the polymerizable material present of a bisperoxide of the formula:

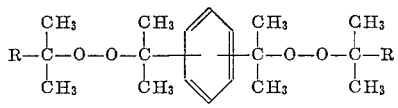

where R is selected from the group consisting of methyl and phenyl, said bisperoxide substantially decomposing at temperatures in excess of 130°C, thereby cross-linking the polymerizable material of said composition; and
c. from about 0.01 percent to about 4.0 percent by weight of the polymerizable material present of the antioxidant 2,6-di(1-methyl heptadecyl)- 4-alkyl phenol.

21. An electrical conductor having an insulation coating of the composition of claim 20.

22. The process which comprises admixing normally solid poylethylene; from about 0.1 percent to about 10 percent by weight of the polyethylene present of bisperoxide of the formula:

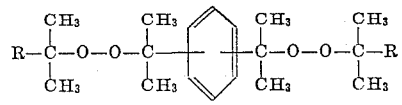

where R is selected from the group consisting of methyl and phenyl; and from about 0.01 percent to about 4.0 percent by weight of the polyethylene present of the antioxidant 2,6-di(1-methyl heptadecyl)-4-aklyl phenol; and heating said admixture to effect crosslinking of the polyethylene.

23. The process which comprises admixing a member selected from the group consisting of polyethylene, blends of polyethylene and other polymers, and copolymers of ethylene and other polymerizable materials, from about 0.1 percent to about 10 percent by weight of the polymerizable material present of a bisperoxide of the formula:

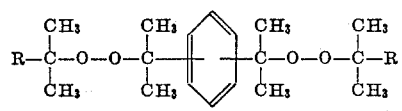

wherein R is selected from the group consisting of methyl and phenyl; and from about 0.01 percent to about 4.0 percent by weight of the polymerizable material present of the antioxidant 2,6-di(1-methyl heptadecyl)-4-alkyl phenol; and heating said admixture to effect cross-linking of said polymerizable material.

24. The method of making an electrical conductor having an insulation coating of the composition of claim 1 which comprises:
a. extruding the composition, at a temperature of from about 170°F to about 340°F, onto an electrical conductor;
b. curing the coated electrical conductor by passing through a continuous vulcanization tube having an operating temperature of from about 350°F to about 480°F; and
c. cooling the cured, coated electrical conductor.

25. The method of making an electrical conductor having an insulation coating of the composition of claim 20, which comprises:
a. extruding the composition, at a temperature of from about 170°F to about 340°F, onto an electrical conductor;
b. curing the coated electrical conductor by passing through a continuous vulcanization tube having an operating temperature of from about 350°F to about 480°F; and
c. cooling the cured, coated electrical conductor.

26. A curable composition of matter comprising:
a. normally solid polyethylene;
b. from about 0.1 percent to about 10 percent by weight of the polyethylene present of a bisperoxide of the formula:

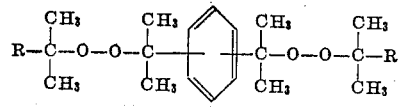

where R is selected from the group consisting of methyl and phenyl, said bisperoxide substantially decomposing at temperatures in excess of 130°C, thereby crosslinking the polyethylene of said composition.
  c. from about 0.5 percent to about 400 percent by weight of the polyethylene present of a filler selected from the group consisting of silica, carbon black, alumina, and calcium silicate; and
  d. from about 0.01 percent to about 4.0 percent by weight of the polyethylene present of the antioxidant 2,6-di(1-methyl heptadecyl)-4-alkyl phenol.

27. A cured composition according to claim 26 having been cured at a temperature in excess of 130°C.

28. A composition according to claim 26 wherein the bisperoxide is α, α, α', α'-tetramethyl isophthalyl di-t-butyl bisperoxide.

29. A cured composition according to claim 28, having been cured at a temperature in excess of 130°C.

30. A composition according to claim 26, wherein the bisperoxide is αα, α', α'-tetramethyl isophthalyl di-cumyl bisperoxide.

31. A cured composition according to claim 30, having been cured at a temperature in excess of 130°C.

32. The composition of claim 26, wherein the antioxidant is 2,6-di(1-methyl heptadecyl)-4-methyl phenol.

33. A cured composition according to claim 32, having been cured at a temperature in excess of 130°C.

34. A composition according to claim 32, wherein the bisperoxide is α, α, α', α'-tetramethyl isophthalyl di-t-butyl bisperoxide.

35. A cured composition according to claim 34, having been cured at a temperature in excess of 130°C.

36. A composition according to claim 32, wherein the bisperoxide is α, α, α', α'-tetramethyl isophthalyl di-cumyl bisperoxide.

37. A cured composition according to claim 36, having been cured at a temperature in excess of 130°C.

38. The composition of claim 26, wherein the antioxidant is 2,6-di(1-methyl heptadecyl)-4-ethyl phenol.

39. A cured composition according to claim 38, having been cured at a temperature in excess of 130°C.

40. A composition according to claim 38, wherein, the bisperoxide is α, α, α', α'-tetramethyl isophthalyl di-t-butyl bisperoxide.

41. A cured composition according to claim 40, having been cured at a temperature in excess of 130°C.

42. A composition according to claim 38, wherein the bisperoxide is α, α, α', α'-tetramethyl isophthalyl di-cumyl bisperoxide.

43. A cured composition of matter according to claim 42, having been cured at a temperature in excess of 130°C.

44. An electrical conductor having an insulation coating of the composition of claim 26.

45. A curable composition comprising:
  a. a member selected from the group consisting of polyethylene, blends of polyethylene and other polymers, copolymers of ethylene and other polymerizable materials;
  b. from about 0.01 percent to about 10 percent by weight of the polymerizable material present of a bisperoxide of the formula:

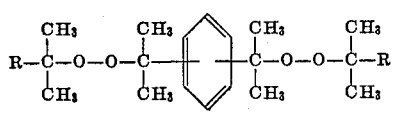

where R is selected from the group consisting of methyl and phenyl, said bisperoxide susbstantially decomposing at temperatures in excess of 130°C, thereby crosslinking the polymerizable material of said composition;
  c. from about 0.5 percent to about 400 percent by weight of the polymerizable material present of a filler selected from the group consisting of silica, carbon black, alumina, and calcium silicate; and
  d. from about 0.01 percent to about 4.0 percent by weight of the polymerizable material present of the antioxidant 2,6-di(1-methyl heptadecyl)-4-alkyl phenol.

46. An electrical conductor having an insulation coating of the composition of claim 45.

47. The process which comprises admixing normally solid polyethylene; from about 0.1 percent to about 10 percent by weight of the polyethylene present of bisperoxide of the forumla:

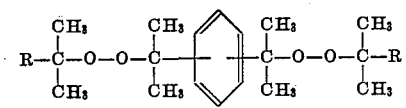

where R is selected from the group consisting of methyl and phenyl; from about 0.5 percent to about 400 percent by weight of the polyethylene present of a filler selected from the group consisting of silica, carbon black, alumina, and calcium silicate; and from about 0.01 percent to about 4.0 percent by weight of the polyethylene present of the antioxidant 2,6-di(1-methyl heptadecyl)-4-alkyl phenol; and heating said admixture to effect cross-linking of the polyethylene.

48. The process which comprises admixing a member selected from the group consisting of polyethylene, blends of polyethylene and other polymers, and copolymers of ethylene and other polymerizable materials; from about 0.10 percent to about 10 percent by weight of the polymerizable material present of a bisperoxide of the formula:

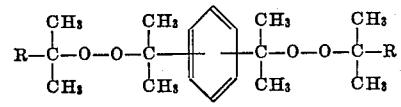

wherein R is selected from the group consisting of methyl and phenyl; from about 0.5 percent to about 400 percent by weight of the polymerizable material present of a filler selected from the group consisting of silica, carbon black, alumina, and calcium silicate; and from about 0.01 percent to about 4.0 percent by weight of the polymerizable material present of the antioxidant 2,6-di(1-methyl heptadecyl)-4-alkyl phenol; and heating said admixture to effect cross-linking of said polymerizable material.

49. The method of making an electrical conductor having an insulation coating of the composition of claim 26, which comprises;
  a. extruding the composition, at a temperature of from about 170°F to about 340°F, onto an electrical conductor;
  b. curing the coated electrical conductor by passing through a continuous vulcanization tube having an operating temperature of from about 350°F to about 480°F; and c. cooling the cured, coated electrical conductor.

50. The method of making an electrical conductor having an insulation coating of the composition of claim 45, which comprises:

a. extruding the composition, at a temperature of from about 170°F to about 340°F, onto an electrical conductor;

b. curing the coated electrical conductor by passing through a continuous vulcanization tube having an operating temperature of from about 350°F to about 480°F; and c. cooling the cured, coated electrical conductor.

* * * * *